Jan. 21, 1969   J. C. VAIDEN   3,422,693
ELECTROMECHANICAL ACTUATOR FOR GUIDED MISSILE
Filed Sept. 30, 1965
FIG. 1
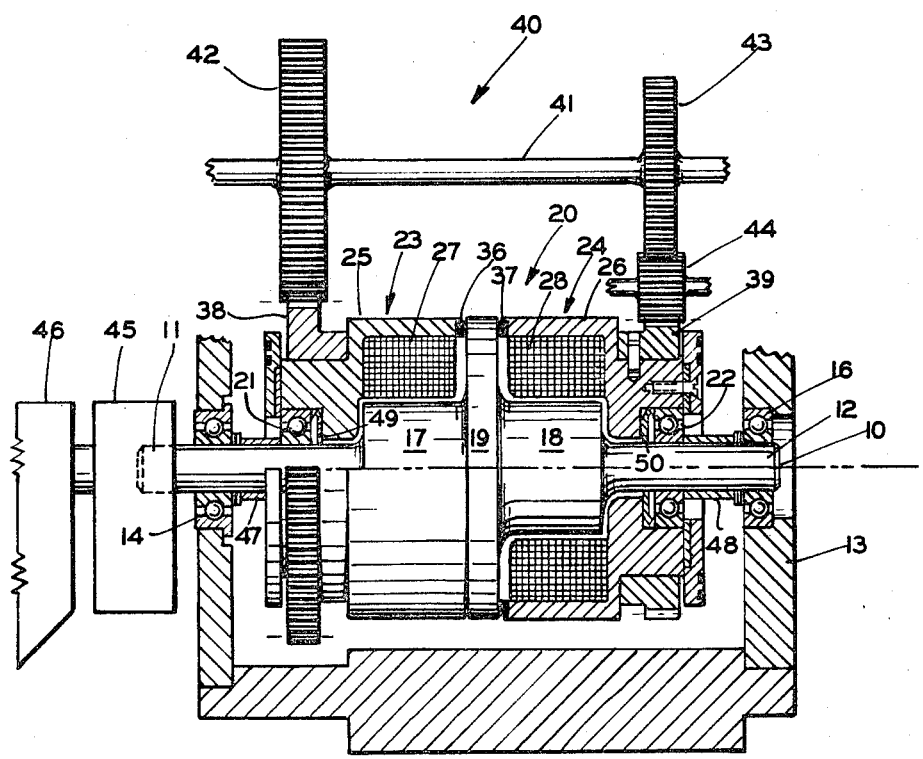
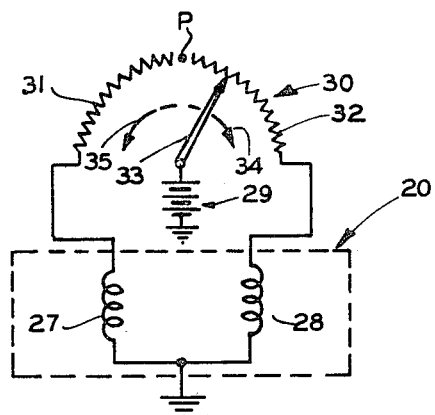
FIG. 2
INVENTOR.
JOHN C. VAIDEN
BY
Constantine A. Michalos
ATTORNEY United States Patent Office 3,422,693
Patented Jan. 21, 1969

3,422,693
ELECTROMECHANICAL ACTUATOR FOR
GUIDED MISSILE
John C. Vaiden, Wayne, N.J., assignor to The Bendix
Corporation, a corporation of Delaware
Filed Sept. 30, 1965, Ser. No. 491,649
U.S. Cl. 74—377                 2 Claims
Int. Cl. F16h 3/14; F16d 27/12

ABSTRACT OF THE DISCLOSURE

A duplex clutch assembly in an actuator having an input means to drive a pair of cups in opposite directions about a common axis, a friction disk at the end periphery of each cup and a solenoid coil within each cup and positioned adjacent to opposite clutch surfaces of an armature flange attached to an output shaft, and electrical means to control the energization of the solenoid coils and to effect rotational torque of the armature flange and the friction disk of the cup having the greater energization of the solenoid coil therein so as to provide selective speed and direction of output shaft rotation.

---

This invention relates to actuators and more particularly to an electromechanical servo actuator for angularly positioning fins for steering a missile.

Vehicles, such as guided missiles, necessitate the use of aerodynamic fins which must be positioned angularly for steering. The positioning of the fins may be done by rotating actuators driven by a variety of means such as by hydraulic, electromechanical or pneumatic power.

The overall missile actuator may be an assembly of a plurality of independent mechanical drive channels driven by a single input shaft and mounted into a common housing. Its principal elements are a primary reduction gear stage which distributes the energy to the output channels and reduces the speed by a factor. A duplex clutch in each channel is used which controls the direction and magnitude of transmitted torque. In addition, a second reduction gear stage may be used with an output shaft position sensing potentiometers. Provisions for strain gages for sensing output torque and provisions for rate generators for damping are also used with a housing for supporting the elements and attaching them to the airframe.

This invention provides for one of the rotating electrically controlled channels or mechanical actuators which drive is based on a direct mechanical transmission thus avoiding the complexities of energy converting. This type of an actuator requires no exotic materials, no extreme precision and requires very few parts. Equally attractive is the fact that this invention provides for an actuator of a light weight, of a small size and with minimal electrical power requirements.

Therefore, an object of this invention is to provide a small actuator having constantly engaged solenoid clutches with constant air gaps therebetween.

Another object of this invention is to provide an actuator having self-alignment clutch surfaces.

A further object of this invention is to provide an actuator having friction characteristics insensitive to temperature.

An additional object of this invention is to provide an electromechanical actuator having simplicity in construction and light weight.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:

FIGURE 1 shows a side elevational view partly in section of an actuator assembly in accordance with a preferred embodiment of this invention; and, FIGURE 2 shows the electrical circuitry operably connected to the invention shown in FIGURE 1.

Referring to the drawing, there is shown an axial output shaft 10 pivotal on two end portions 11 and 12 and supported by a frame 13 through bearings 14 and 16. The shaft 10 serves as a tie in support for two solenoid plungers 17 and 18 having a central integral flange 19 which serves as armature and clutch faces.

The shaft 10 extends on each side of a duplex electromechanical clutch assembly 20. The clutch assembly 20 is supported on the solenoid shaft 10 by a pair of bearings 21 and 22 which in turn is supported on the frame 13 by the bearings 14 and 16.

The duplex clutch 20 comprises a pair of clutch subassemblies 23 and 24. The subassemblies 23 and 24 comprise a pair of cups 25 and 26 supporting electric solenoid coils 27 and 28 positioned coaxially over each plunger 17 and 18, respectively, in a manner such that energizing either solenoid will generate a magnetic pull between the solenoid body and the flange 19. This pull being proportional to the energizing current supplied by a direct current source 29 through a two coil rheostat 30 shown in FIGURE 2. The rheostat 30 includes coil 31 for controlling current to solenoid 27, coil 32 for controlling current to solenoid 28, and a wiper 33 which provides the differential current between the two solenoids.

When the wiper 33 is at mid point position P, each solenoir has minimum excitation. When the wiper 33 is on coil 32 in the direction of arrow 34, as shown in FIGURE 2, coil 32 will be excited proportional to the wiper 31 position to direct current to solenoid 28 to rotate the actuator counterclockwise. When the wiper 33 is moved to the coil 31 in the direction of the arrow 35, coil 31 will be excited to direct current to solenoid 27 to rotate the actuator clockwise.

Therefore, as provided in FIGURE 2, both solenoids are not simultaneously energized thus preventing the dissipation of power. Normal operation of the electrical circuitry of FIGURE 2 provides for de-energizing one side while the other is energized to the level required. That is, to transfer from one direction of rotation of the actuator to the other, the current is reduced to zero.

Between cups 25 and 26 and the flange 19 are placed carbon friction discs 36 and 37 which are used as clutch slip surfaces between the cups 25 and 26 and the flange 19.

The clutch subassemblies 23 and 24 are connected to drive pinions 38 and 39 driven in opposite directions by an input gear arrangement 40. That is, the input gear arrangement 40 comprises an input shaft 41 mounting a pair of gears 42 and 43. The gear 42 drives the subassembly 23 through the pinion 38, and the gear 43 drives the clutch subassembly 24 in the opposite direction through an idler gear 44 and the pinion 39.

On the output end portion 11 of the solenoid shaft 10 is mounted a reduction gear assembly 45 which in turn may angularly position a device to be rotated such as a fin 46 of a missile.

Therefore, the heart of this invention is the duplex clutch assembly 20 having an axial shaft 10 forming the frame of the clutch and serving as a plunger. In addition the invention provides for the two integral solenoid plungers 17 and 18 having the central integral flange 19 which serves as the armature and the clutch surfaces in cooperation with the discs 36 and 37.

The clutch assembly 23 includes the solenoid coil 27 which is positioned over the plunger 17. The clutch assembly 24 includes the solenoid 28 which is positioned over the plunger 18. The solenoid coils 27 and 28 are energized by the direct current source 29 through rheostat 30 to generate a magnetic pull between the clutch assembly 23 or 24 and the flange 19, depending on the desired direction of rotation of the fin 46.

It should also be noted that installed between the bearings 14 and 21, and 16 and 22 are a pair of sleeves 47 and 48 respectively which provide means for restraining the solenoids 17 and 18 from excessive axial movement while permitting radial rotation.

Preload springs 49 and 50 which may be of a diaphragm type are provided to spring load bearings 21 and 22 so as to keep the solenoids 27 and 28 with the cups 25 and 26 in contact with the flange 19 when the solenoids 27 and 28 are not energized.

Since the clutch subassemblies 23 and 24 are engaged positively with the input shaft 41, the solenoids rotate at constant speed throughout the entire operating period. Since they rotate in opposite directions and bearing against the same flange, the generated drag torques are equal and the net output at the end portion 11 of the shaft 10 is zero. Energizing either solenoid 27 or 28 unbalances the drag torques and an output torque develops which is proportional to the excitation current.

In the operation of the system the coils 27 and 28 are electrically connected to the power source 29 and an input shaft rotation is provided mechanically to shaft 10. Before being energized, the clutch faces slip with minimum drag and essentially no torque is transmitted by the output portion of the shaft 11. As one clutch portion, for example the solenoid 28, is energized, the drag between the one surface of the flange 19 and the disc 37 increases in proportion to the energizing current.

The torque T varies at the clutches as given by the formula $T=fPr$ where $f$ is the coefficient of friction of the clutch surface, P is the axial pull of the solenoid and $r$ is the radius of the clutch surface. The radius $r$ is constant and $f$ is essentially constant. Therefore, T varies directly with P.

The pull P of the solenoid is developed from the magnetic lines of flux across the air gap between its cup and the flange 19. In this invention the air gap is held constant. Therefore, since the magnetic lines or forces vary with current, P is essentially proportional to the current.

In the non-energized condition, the drag torques oppose each other so that the torques balance out. Obviously they are not able to balance out exactly so that a bias torque is expected. This can be offset, if necessary, by adjusting the preload springs.

In this invention, as brought out before, it is not desirable to energize both solenoids simultaneously since this would dissipate power needlessly. Normal operation is to have one side de-energized while the other is energized to the level required, and to transfer from one side to the other, by reducing the current zero as the direction reverses.

Although only one embodiment of the invention has been illustrated and described, various changes in the form and relative arrangements of the parts, which will now appear to those skilled in the art may be made without departing from the scope of the invention. Reference is, therefore, to be had to the append claims for a definition of the limits of the invention.

What is claimed is:

1. An electromechanical servo actuator for angularly positioning an element, the actuator comprising an axial output shaft, a frame pivotally mounting said shaft, a pair of plungers integral to said shaft, an armature flange mounted on said output shaft and interposed between said plungers, said armature flange extending radially of said plungers and having clutch surfaces on each side, friction disks supported on each surface of said flange, a pair of clutch assemblies, one of said pair of clutch assemblies supported adjacent each of said disks, means for driving one of said pair of clutch assemblies in one direction and the other of said clutch assemblies in an opposite direction about the output shaft axis, a solenoid supported within each clutch assembly about one plunger, a source of direct current energy, a rheostat having opposing ends connected to the solenoids and connected between said ends to the source of direct current energy for selectively varying in opposite senses the energizing current from said source to said solenoid coils for applying opposing electromagnetic forces to said armature flange so that the coil having the greater energizing current effects an axial bias equal to a difference between the opposing electromagnetic forces against the friction disk on an effective surface of said armature flange so as to apply a torque varying with said difference to cause one of said pair of clutch assemblies to rotate said armature flange in the direction of rotation of the clutch assembly rendered effective by the solenoid coil with the greater energizing current.

2. An electromechanical actuator for angularly positioning an element, the actuator comprising an axial output shaft, a frame pivotally mounting said output shaft, a pair of plungers located substantially centrally of said output shaft, an armature flange mounted on said output shaft and having two opposed surfaces interposed between said plungers, a clutch cup adjacent each surface of said flange, a friction disc interposed between each surface of said armature flange and each cup, a pinion gear connecting each cup, an idler gear connecting one of the pinion gears, an input drive shaft, a pair of gears mounted on said input shaft, one of said gears engaging the idler gear to drive one cup in one direction and the other of said gears engaging the pinion of the other cup to drive it in a reverse direction, a rheostat, a source of electrical energy, a solenoid coil mounted in each cup, each coil electrically connected to said rheostat and in parallel to said source of electrical energy for electrical energization to apply electromagnetic forces to bias said armature flange in opposite senses, a wiper connected between said source of electrical energy and said rheostat for selectively varying in opposite senses energizing current from said source to said solenoid coils for controlling the biasing forces applied between said solenoid coils to said armature flange and to effect a rotational torque between one or the other of said cups and the surface adjacent thereto depending on the selected sense of energization of each coil effected by said wiper so as to angularly position the element.

References Cited

UNITED STATES PATENTS

| 1,866,675 | 7/1932 | Sarazin | 192—84 |
| 2,718,936 | 9/1955 | Rohrer et al. | 192—107 |
| 2,777,285 | 1/1957 | McDonald | 192—215 |
| 2,949,038 | 8/1960 | Jopson | 74—377 |

DONLEY J. STOCKING, *Primary Examiner.*

HENRY S. LAYTON, *Assistant Examiner.*

U.S. Cl. X.R.

74—365; 192—21.5